US009955005B2

(12) United States Patent
Balaji et al.

(10) Patent No.: US 9,955,005 B2
(45) Date of Patent: Apr. 24, 2018

(54) SUPPRESSION OF ANNOUNCEMENTS IN COMMUNICATION NETWORKS (75) Inventors: Jayakumar Balaji, Chennai (IN); Balasubramanian Gopalasubramanian, Chennai (IN); Ramachandran Gopannan, Chennai (IN); Madhavan Ramesh, Chennai-Tamil Nadu (IN)

(73) Assignee: Alcatel Lucent, Boulogne-Billancourt (FR)

( * ) Notice: Subject to any disclaimer, the term of this patent is extended or adjusted under 35 U.S.C. 154(b) by 424 days.

(21) Appl. No.: 13/640,899

(22) PCT Filed: Sep. 3, 2010

(86) PCT No.: PCT/EP2010/062961
§ 371 (c)(1),
(2), (4) Date: Feb. 20, 2013

(87) PCT Pub. No.: WO2012/000566
PCT Pub. Date: Jan. 5, 2012

(65) Prior Publication Data
US 2013/0148548 A1   Jun. 13, 2013

(30) Foreign Application Priority Data
Jun. 30, 2010   (IN) .......................... 1851/CHE/2010

(51) Int. Cl.
*H04L 12/66* (2006.01)
*H04M 3/42* (2006.01)
*H04L 29/06* (2006.01)

(52) U.S. Cl.
CPC ...... *H04M 3/4217* (2013.01); *H04L 65/1006* (2013.01); *H04L 65/1033* (2013.01); *H04L 65/1069* (2013.01); *H04L 65/1096* (2013.01)

(58) Field of Classification Search
CPC ... H04L 2012/64; H04L 12/64; H04L 65/102; H04L 29/06176; H04L 12/6418
(Continued)

(56) References Cited

U.S. PATENT DOCUMENTS 7,006,455 B1 * 2/2006 Fandrianto ............... H04M 3/56
 370/260
7,983,245 B2 * 7/2011 Eichler et al. ............... 370/352
(Continued)

FOREIGN PATENT DOCUMENTS

JP    2000-069171 A    3/2000

OTHER PUBLICATIONS

"3rd Generation Partnership Project: Technical Specification Group Core Network and Terminals; Customised Applications for Mobile network Enhanced Logic Phase 4; Stage 2 (Release 9)", 3GPP TS 23.078. France, Dec. 2009.
(Continued)

*Primary Examiner* — Brenda H Pham
(74) *Attorney, Agent, or Firm* — Harness, Dickey & Pierce, P.L.C.

(57) ABSTRACT

Suppression of Announcements in Communication Networks. The present invention relates to communication networks and, more particularly, to announcements in communication networks. System and method for suppression of announcement made to a user in a communication network. A user requests to start a communication session with a second user in the network. A suppression of announcement indicator is added in Connect operation while the communication session is being established with the second user and the announcement is suppressed from being played to the user if the second user is unable to answer the request. The users may be IMS users and/or PSTN users belonging to the same network or different networks.

10 Claims, 8 Drawing Sheets (58) Field of Classification Search
USPC .......................................... 370/352–356, 389
See application file for complete search history.

(56) References Cited

U.S. PATENT DOCUMENTS

| | | |
|---|---|---|
| 8,462,768 B2 * | 6/2013 | Badger .................... 370/352 |
| 2004/0120494 A1 * | 6/2004 | Jiang et al. .............. 379/210.01 |
| 2010/0035584 A1 * | 2/2010 | Hadinata ........... H04M 3/53383 |
| | | 455/413 |

OTHER PUBLICATIONS

International Search Report PCT/ISA/210 for International Application No. PCT/EP2010/062961 dated Feb. 4, 2011.
Written Opinion of the International Searching Authority PCT/ISA/237 for International Application No. PCT/EP2010/062961 dated Feb. 4, 2011.
Digital cellular telecommunications system (Phase 2+); Universal Mobile Telecommunications System (UMTS); Customized Applications for Mobile network Enhanced Logic (CAMEL) Phase X; Stage 2(3GPP TS 23.078 version 9.0.0 Release 9), ETSI TS 123 078 V9.0.0, Feb. 2010.

* cited by examiner

SUPPRESSION OF ANNOUNCEMENTS IN COMMUNICATION NETWORKS

TECHNICAL FIELD

The present invention relates to communication networks and, more particularly, to announcements made in communication networks.

BACKGROUND

When a user in a communication network wishes to communicate with a second user, then the user sends a request to the second user through the network. For any reason, when the second user is not able to reply to the request and communicate with the user, then the network plays a failure announcement to the user. The failure announcement would indicate the reason for the failure in establishing a communication session with the second user. For example, if the second user is busy and does not reply to the request, then an announcement like "Called user is busy" may be played to the user.

The failure announcements convey the reason for the failure in establishing a communication session and are thus useful means for conveying the reason for the failure. However, in some cases the user may be charged for the announcement being played and the user has to pay usage charges although a communication session was not established with the second user. Also, due to the failure announcement being played from the network of the second user or from an intermediate exchange, the network would not be able to allow the user to reconnect the communication session to a different number or to a third user. In systems, such as Time-Division Multiplexing (TDM) systems, the failure announcement may be suppressed from being played to the user. But in Internet Protocol Multimedia Subsystem (IMS) systems, there is no Session Initiation Protocol (SIP) interface to suppress failure announcements from being played.

SUMMARY

In view of the foregoing, an embodiment herein provides a method for suppression of announcement made to a user on receiving a request from a user to start a communication session with a second user in the network. A suppression of announcement indicator is added in Connect operation while the communication session is being established with the second user and the announcement is suppressed from being played to the user if the second user is unable to answer the request. The user is a Session Initiation Protocol (SIP) user and the second user a Public Switched Telephone Network (PSTN) user. The user may be a Session Initiation Protocol (SIP) user and the second user is also a Session Initiation Protocol (SIP) user. The user may also be a Public Switched Telephone Network (PSTN) user and the second user a Session Initiation Protocol (SIP) user. The suppression of announcement indicator is added as a Suppression of Announcement (SOA) bit in the Connect operation. The Suppression of Announcement (SOA) bit is added in P-Interaction-Indicator when the user is an Internet Protocol Multimedia Subsystem (IMS) user. The Suppression of Announcement (SOA) bit is added in National-Parameter when the user is a Public Switched Telephone Network (PSTN) user. The announcement indicates a reason for the second user being unable to answer the request. Session Initiation Protocol (SIP) or Integrated Services Digital Network (ISDN) User Part (ISUP) is the interface between the first user and the second user.

Embodiments further disclose a module for suppression of announcement made to a user on receiving a request from a user for starting a communication session with a second user in the network and adds a suppression of announcement indicator in Connect operation while the communication session is being established with the second user. The module is a Service Control Point (SCP) or an Application Server (AS). The user is a Session Initiation Protocol (SIP) user and the second user a Public Switched Telephone Network (PSTN) user. The user may be a Session Initiation Protocol (SIP) user and the second user is also a Session Initiation Protocol (SIP) user. The user may also be a Public Switched Telephone Network (PSTN) user and the second user a Session Initiation Protocol (SIP).

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method for suppressing announcements from being announced to an IMS user. The announcements may convey to the user, the reason for the failure in establishment of communication session with the destination. Referring now to the drawings, and more particularly to FIGS. 1 through 8, where similar reference characters denote corresponding features consistently throughout the figures, there are shown embodiments.

Figure 1:
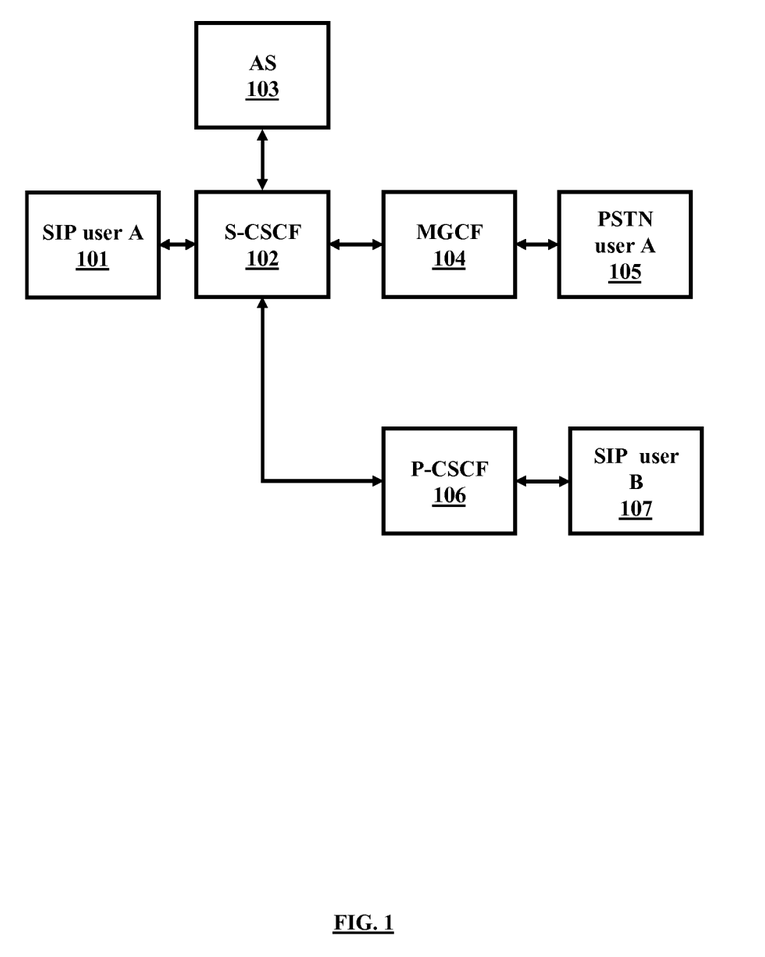
FIG. 1 illustrates a block diagram of users in an IMS network, according to an embodiment herein.

FIG. 1 illustrates a block diagram of users in an IMS network. If a user in a communication network wishes to communicate with a second user, then the user sends a request to the second user through the network. The users may be Session Initiation Protocol (SIP) users or Public Switched Telephone Network (PSTN) users. The users may belong to the same network or the users may belong to different networks. Session Initiation Protocol (SIP) or Integrated Services Digital Network (ISDN) User Part (ISUP) is used to interface between the users.

If the communication session is to be established between a SIP user as the calling user and a PSTN user as the called user, then SIP user A 101 sends a request to PSTN user A 105 through the network. The request would be received by a Serving Call Session Control Function (S-CSCF) 102. The S-CSCF 102 provides session control for subscribers accessing services within the IMS network. The S-CSCF 102 receives requests for services from SIP user A 101, processes the requests and relays the request to an Application Server (AS) 103. The AS 108 hosts and executes services requested by SIP user A 101 and interfaces with the S-CSCF 102 using SIP. In an IMS network the AS 103 hosts a particular service or part of a service. The service may be invoked through SIP based communication with the S-CSCF 102. When the AS 103 receives the request and on determining that SIP user A 101 wishes to start a communication session with PSTN user A 105, the AS 103 tries to establish a communication link with PSTN user A 105. If due to any reason, PSTN user A 105 is not able to reply to the request, then a communication session would not be established between the users. An announcement would then be played to SIP user A 101 conveying the reason for the failure in establishment of communication session with PSTN user A 105. For example, a communication session would not be established with PSTN user A 105 if PSTN user A 105 is busy, PSTN user A 105 does not reply to the request, there is no available network path to PSTN user A 105, SIP user A 101 does not have enough currency in the account to establish the communication session with PSTN user A 105 and the communication terminal of PSTN user A 105 is not available for establishing the communication session. The announcement that is played to SIP user A 101 may be "Called user has not replied". The announcement may be video announcement, audio announcement, text announcement or any media type that can be used to convey information. The AS 103 adds an indicator in the request message and sends the subsequent message towards PSTN user A 105. The indicator is added to suppress the announcement played to SIP user A 101. For example, the indicator may be added as a part of the Connect operation and a Suppression of Announcement (SOA) indicator may be added as "ALLOW: SOA" in P-Interaction-Indicator as a part of the request message. If SIP user A 101 and PSTN user A 105 are in different IMS networks, then on receiving the SOA indicator, the network of PSTN user A 105 determines that any failure announcement should be suppressed from being played to SIP user A 101. The message sent by the AS 103 to PSTN user A 105 would be received by a Media Gateway Control Function (MGCF) 104. The MGCF 104 receives the message and interworks the message in order for the message to be understood by PSTN user A 105. The MGCF 104 maps the SOA indicator received from the AS 103 to a message that can be understood by the network of PSTN user A 105. For example, the MGCF 104 may map the SOA indicator to an Initial Address Message (IAM) sent to SIP user C 205. The SOA indicator may be SOA indicator added as "SOA: TRUE" in National Parameter as a part the IAM. The MGCF 104 then sends the request to PSTN user A 105. If PSTN user A 105 replies to the request then a communication session would be established between the users. If PSTN user A 105 does not reply to the request then the network of PSTN user A 105 or an intermediate network conveys the reason for PSTN user A 105 not replying to the request, to the network of SIP user A 101. A communication session would not be established between the users and the network of SIP user A 101 does not play the failure announcement to SIP user A 101. The PSTN network suppresses the announcement from being made to SIP user A 101.

If the communication session is to be established between a SIP user and as the calling user and a SIP user as the called user, then SIP user A 101 sends a request to SIP user B 107 through the network. The request would be received by the S-CSCF 102. The S-CSCF 102 receives requests for services from SIP user A 101, processes the requests and relays the request to the AS 103. When the AS 103 receives the request and on determining that SIP user A 101 wishes to start a communication session with SIP user B 107, the AS 103 tries to establish a communication link with SIP user B 107. If due to any reason, SIP user B 107 is not able to reply to the request, then a communication session would not be established between the users. An announcement would then be played to SIP user A 101 conveying the reason for the failure in establishment of communication session with SIP user B 107. The AS 103 adds an indicator in the request message and sends the subsequent message towards SIP user B 107. The indicator is added to suppress the announcement played to SIP user A 101. For example, the indicator may be added as a part of the Connect operation and a Suppression of Announcement (SOA) indicator added as "ALLOW: SOA" in P-Interaction-Indicator as a part of the request message. If SIP user A 101 and SIP user B 107 are in different IMS networks, then on receiving the SOA indicator, the network of SIP user B 107 determines that any failure announcement should be suppressed from being played to SIP user A 101. The message sent by the AS 103 to SIP user B 107 would be received by a Proxy Call Session Control Function (P-CSCF) 106. The P-CSCF 106 relays the request to SIP user B 107. If SIP user B 107 replies to the request then a communication session would be established between the users. If SIP user B 107 does not reply to the request then the network of SIP user B 107 an intermediate network conveys the reason for SIP user B 107 not replying to the request, to the network of SIP user A 101. A communication session would not be established between the users and the network of SIP user A 101 does not play the failure announcement to SIP user A 101. The S-CSCF 102 suppresses the announcement from being made to SIP user A 101.

Figure 2:
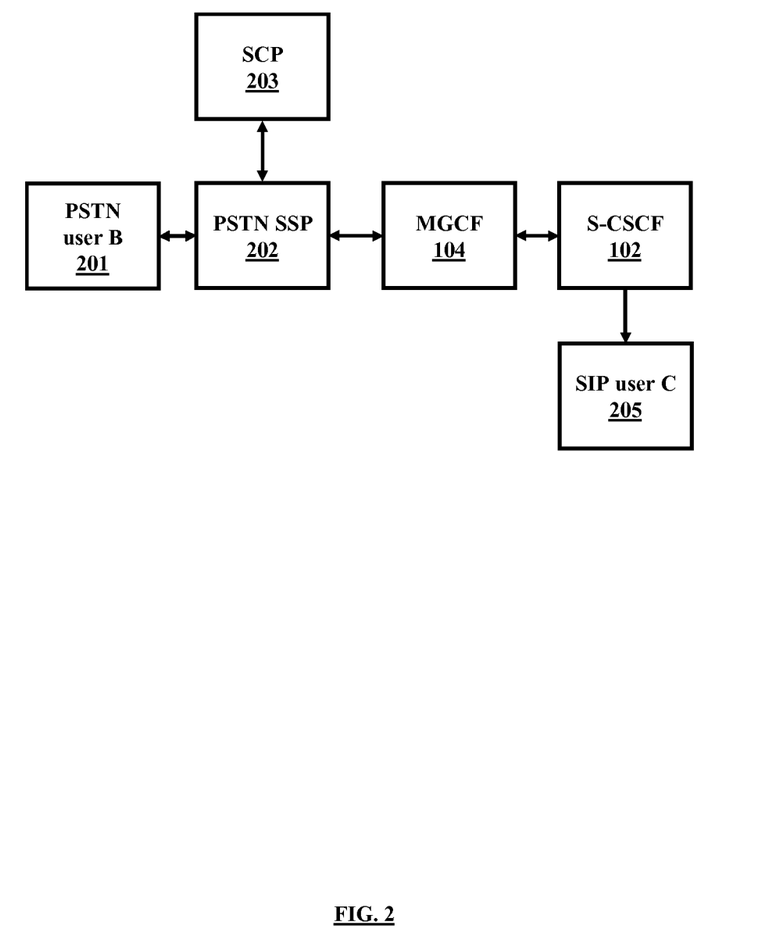
FIG. 2 illustrates a block diagram of interworking between a PSTN user and a SIP user, according to an embodiment herein.

FIG. 2 illustrates a block diagram of interworking between a PSTN user and a SIP user. When a user in a communication network wishes to communicate with a second user, then the user sends a request to the second user through the network. If the communication session is to be established between a PSTN user as the calling user and a SIP user as the called user, then PSTN user B 201 sends a request to SIP user C 205 through the network. The request would be received by a PSTN Service Switching Point (SSP) 202. On receiving the request from the PSTN user B 201 and on determining that a communication session would have to be established between the users, the PSTN SSP 202 triggers a Service Control Point (SCP) 203. The SCP 203 is used to help control the services offered by the network. The SCP 203 identifies the number to which a communication session is to be routed and then routes the communication session to the number. The SCP 203 contains the service logic that implements the services requested by the PSTN user B 201. When the SCP 203 receives the request and on determining that PSTN user B 201 wishes to start a communication session with SIP user C 205, the SCP 203 tries to establish a communication link with SIP user C 205. If due to any reason, SIP user C 205 is not able to reply to the request, then a communication session would not be established between the users. An announcement would then be played to PSTN user B 201 conveying the reason for the failure in establishment of communication session with SIP user C 205. The SCP 203 adds an indicator in the request message and sends the subsequent message towards SIP user C 205. The indicator is added to suppress the announcement played to PSTN user B 201. For example, the indicator may be SOA indicator added as "SOA: TRUE" in National Parameter as a part of the Connect operation. If PSTN user B 201 and SIP user C 205 are in different IMS networks, then on receiving the SOA indicator, the network of SIP user C 205 determines that any failure announcement should be suppressed from being played to PSTN user B 201. The message sent by the SCP 203 to SIP user C 205 would be received by the MGCF 104. The MGCF 104 is designed to receive, process and generate the signalling associated with establishing communication sessions within the network. The MGCF 104 receives the message generated by the PSTN user B 201 and interworks the message in order for the message to be understood by SIP user C 205 in the IMS network. The MGCF 104 maps the SOA indicator received from the SCP 203 to a message that can be understood by the network of SIP user C 205. For example, the MGCF 104 may map the SOA indicator to an invitation message sent to SIP user C 205. The SOA indicator may be added as "ALLOW: SOA" in P-Interaction-Indicator. The MGCF 104 then sends the message to the S-CSCF 102. The S-CSCF 102 relays the request to SIP user C 205. If SIP user C 205 replies to the request then a communication session would be established between the users. If SIP user C 205 does not reply to the request then the network of SIP user C 205 or an intermediate network conveys the reason for SIP user C 205 not replying to the request, to the network of PSTN user B 201. A communication session would not be established between the users and the network of PSTN user B 201 does not play the failure announcement to PSTN user B 201. If SIP user C 205 does not reply to the request then a communication session would not be established between the users and the failure announcement would not be played to PSTN user B 201. The S-CSCF 102 suppresses the announcement from being made to PSTN user B 201.

Figure 3:
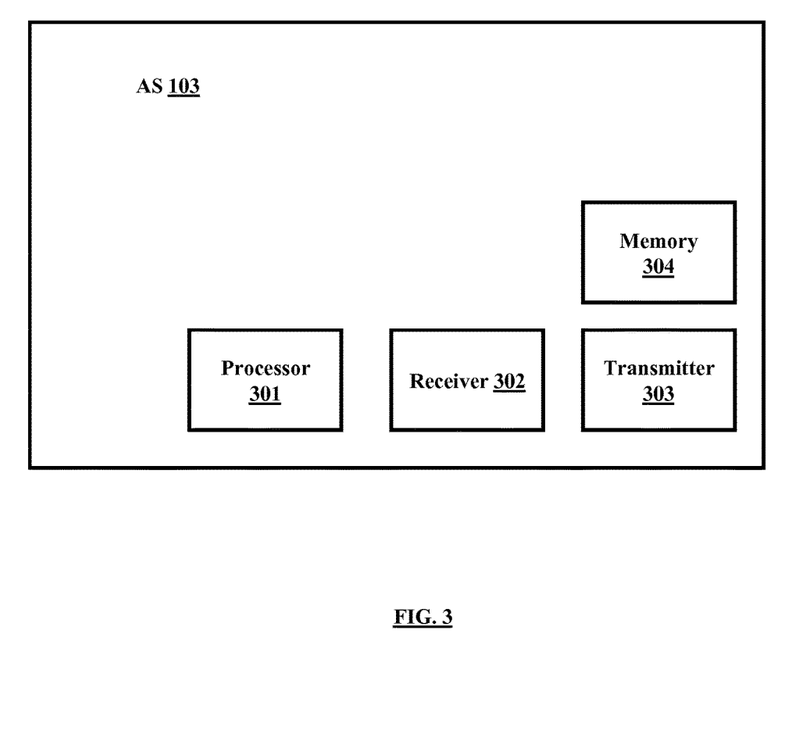
FIG. 3 illustrates a block diagram of an Application Server (AS), according to an embodiment herein.

FIG. 3 illustrates a block diagram of an Application Server (AS). When a user in an IMS network wishes to communicate with a second user, then the user sends a request to the second user through the network. If the communication session is to be established between a SIP user as the calling user and a PSTN user as the called user or between two SIP users, the request would be received by the AS 103 from the S-CSCF 102. The AS 103 receives the request using a receiver 302. When the AS 103 receives the request and on determining that a communication session has to be established between the users, the AS 103 tries to establish a communication link with between the users. If due to any reason, the called user is not able to reply to the request, then a communication session would not be established between the users. An announcement would then be played to the calling user conveying the reason for the failure in establishment of communication session. The announcement to be played is obtained from a memory 304. The AS 103 adds an indicator in the request message and sends the subsequent message towards the called user. The indicator is added to suppress the announcement played to the calling user. A processor 301 controls the functioning of the AS 103. All the actions performed by the AS 103 are co-ordinated by the processor 301. The processor 301 adds the SOA indicator to the message. The AS 103 sends the message towards the called user using a transmitter 303. On receiving the SOA indicator, the network of the called user determines that any failure announcement should be suppressed from being played to the calling user. If the called user replies to the request then a communication session would be established between the users. If the called user does not reply to the request then a communication session would not be established between the users and the failure announcement would not be played to the calling user.

Figure 4:
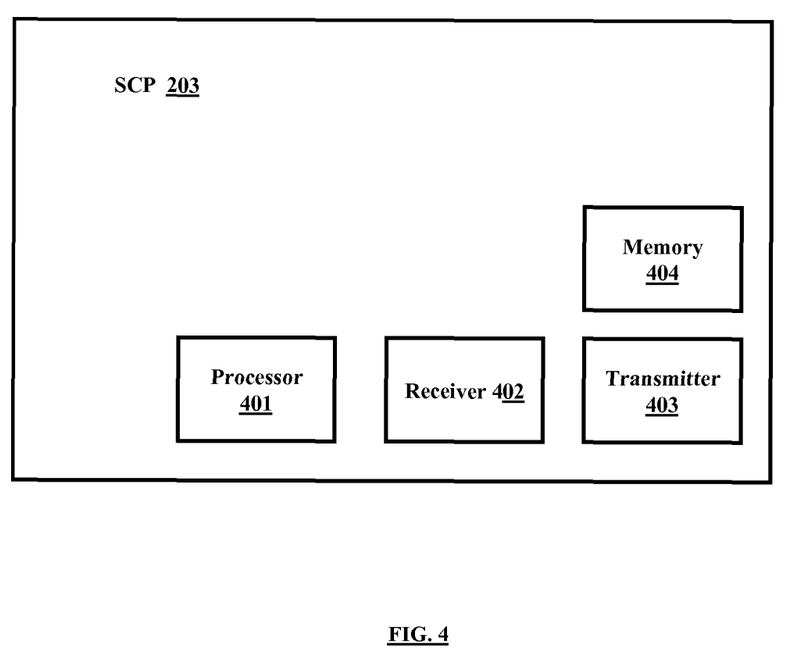
FIG. 4 illustrates a block diagram of a Service Control Point (SCP), according to an embodiment herein.

FIG. 4 illustrates a block diagram of a Service Control Point (SCP). When a user in an IMS network wishes to communicate with a second user, then the user sends a request to the second user through the network. If the communication session is to be established between a PSTN user as the calling user and a SIP user as the called user, the request would be received by the SCP 203 from the PSTN SSP 202. The SCP 203 receives the request using a receiver 402. When the SCP 203 receives the request and on determining that a communication session has to be established between the users, the SCP 203 tries to establish a communication link with between the users. If due to any reason, the called user is not able to reply to the request, then a communication session would not be established between the users. An announcement would then be played to the calling user conveying the reason for the failure in establishment of communication session. The announcement to be played is obtained from a memory 404. The SCP 203 adds an indicator in the request message and sends the subsequent message towards the called user. The indicator is added to suppress the announcement played to the calling user. A processor 401 controls the functioning of the SCP 203. All the actions performed by the SCP 203 are co-ordinated by the processor 401. The processor 401 adds the SOA indicator to the message. The SCP 203 sends the message towards the called user using a transmitter 303. On receiving the SOA indicator, the network of the called user determines that any failure announcement should be suppressed from being played to the calling user. If the called user replies to the request then a communication session would be established between the users. If the called user does not reply to the request then a communication session would not be established between the users and the failure announcement would not be played to the calling user.

Figure 5:
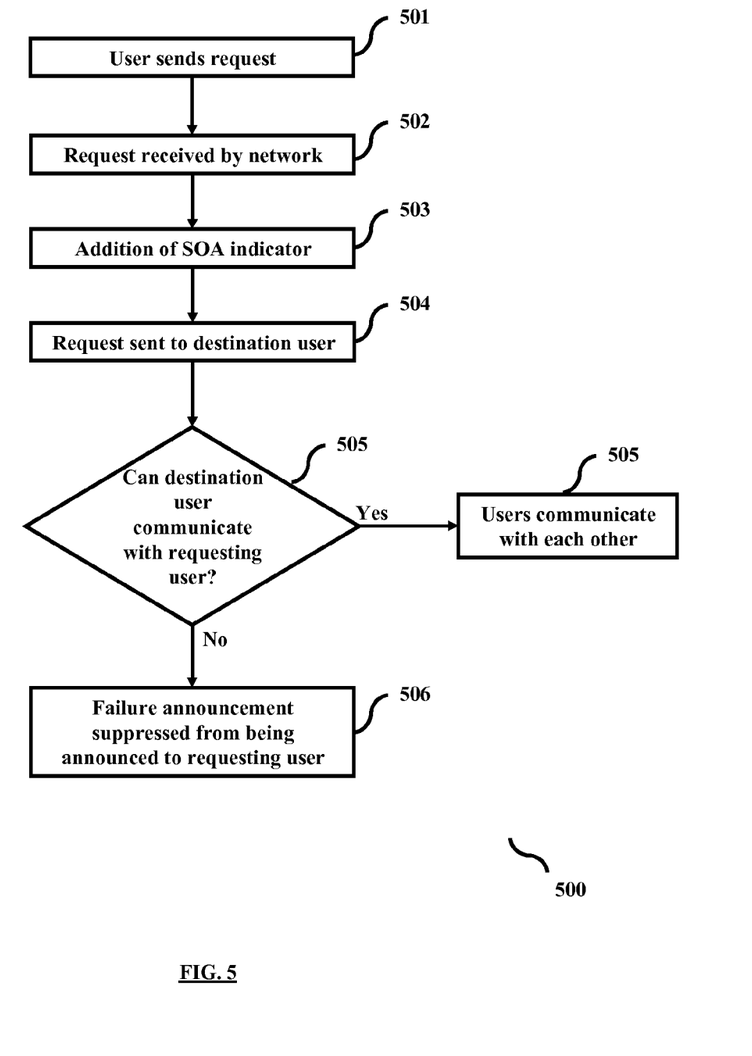
FIG. 5 is a flowchart depicting a method for suppressing announcements from being made to the calling user, according to an embodiment herein.

FIG. 5 is a flowchart depicting a method for suppressing announcements from being made to the calling user. If a user in a communication network wishes to communicate with a second user, then the user sends (501) a request to the second user through the network. The request would be received (502) by the network. On receiving the request from the calling user, the network tries to establish a communication session between the calling user and the called user. If due to any reason, the called user is not able to reply to the request, then a communication session would not be established between the users. An announcement would then be played to the calling user conveying the reason for the failure in establishment of communication session with the called user. The network adds (503) an indicator in the request message and sends the subsequent message towards the called user. The indicator is added to suppress the announcement played to the calling user. The indicator may be added by the AS 103 or the SCP 203. Once the indicator has been added to the request message, the network sends (504) the message towards the called user. If the called user replies to the request (505) then a communication session would be established between the users and the users can communicate (506) with each other. If the called user does not reply (505) to the request then a communication session would not be established between the users and the failure announcement would be suppressed (507) from being played to the calling user. The various actions in method 500 may be performed in the order presented, in a different order or simultaneously. Further, in some embodiments, some actions listed in FIG. 5 may be omitted.

Figure 6:
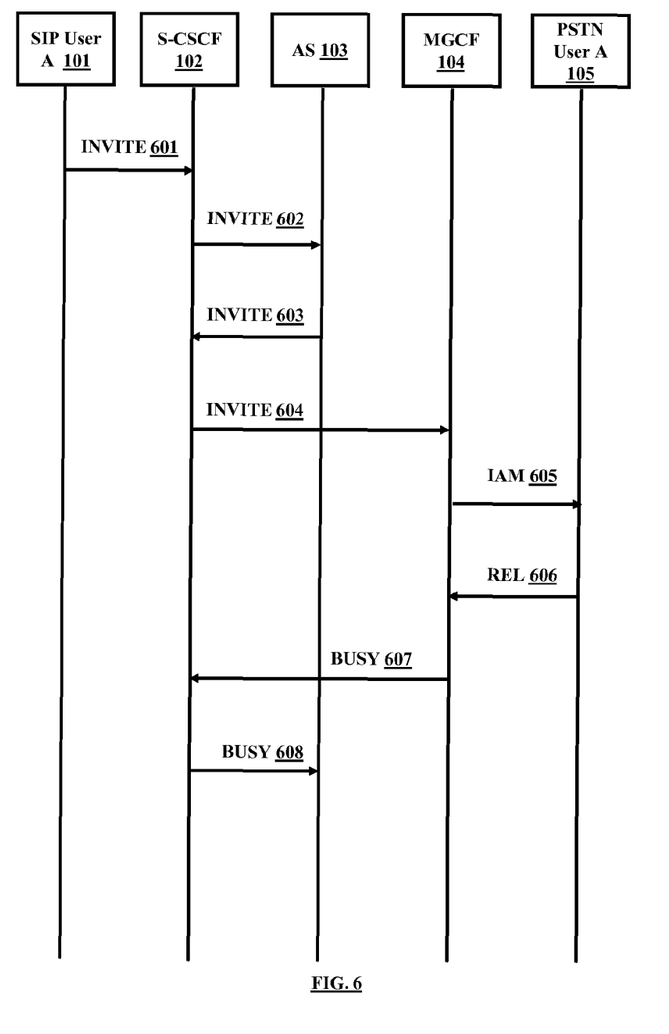
FIG. 6 illustrates a flow diagram for an example illustrating suppression of announcement when calling user is a SIP user and the called user is a PSTN user, according to an embodiment herein.

FIG. 6 illustrates a flow diagram for an example illustrating suppression of announcement when calling user is a SIP user and the called user is a PSTN user. When a user in a communication network wishes to communicate with a second user, then the user sends a request to the second user through the network. If the communication session is to be established between a SIP user as the calling user and a PSTN user as the called user, then SIP user A 101 sends a request to PSTN user A 105 through the network. The request message may be sent as an INVITE 601 message. The request would be received by the S-CSCF 102. The S-CSCF 102 receives requests for services from SIP user A 101, processes the requests and relays the request to the AS 103. The message sent by the S-CSCF 102 to the AS 103 may be an INVITE 602 message. When the AS 103 receives the request and on determining that SIP user A 101 wishes to start a communication session with PSTN user A 105, the AS 103 tries to establish a communication link with PSTN user A 105. If due to any reason, PSTN user A 105 is not able to reply to the request, then a communication session would not be established between the users. An announcement would then be played to SIP user A 101 conveying the reason for the failure in establishment of communication session with PSTN user A 105. The AS 103 adds an indicator in the request message and sends the subsequent message towards PSTN user A 105 through the S-CSCF 102 and the MGCF 104. The indicator is added to suppress the announcement played to SIP user A 101. The message sent by the AS 103 to the S-CSCF 102 may be an INVITE 603 message and the message sent by the S-CSCF 102 to the MGCF 104 may be an INVITE 604 message. The MGCF 104 receives the message and interworks the message in order for the message to be understood by PSTN user A 105. The MGCF 104 maps the SOA indicator received from the AS 103 to a message that can be understood by the network of PSTN user A 105. The MGCF 104 then sends the request to PSTN user A 105 and the message sent by the MGCF 104 to the PSTN user A 105 may be an IAM 605. If PSTN user A 105 is busy and does not reply to the request then an indication would be sent to the MGCF 104. The indication may be sent as a REL 606 message and the message would indicate the reason for the PSTN user A 105 not replying to the request. The MGCF 104 sends the indication to the S-CSCF 102. The indication sent by the MGCF 104 to the S-CSCF 102 may be a BUSY 607 message. On receiving the indication and determining that PSTN user A 105 is busy, the S-CSCF 102 suppresses the failure announcement from being made to SIP user A 101. The S-CSCF 102 then sends the indication to the AS 103. The indication sent by the S-CSCF 102 to the AS 103 may be a BUSY 608 message. On receiving the indication and determining that the communication session was not established between SIP user A 101 and PSTN user A 105, the AS 103 may allow SIP user A 101 to try to establish the communication session with a different destination number.

Figure 7:
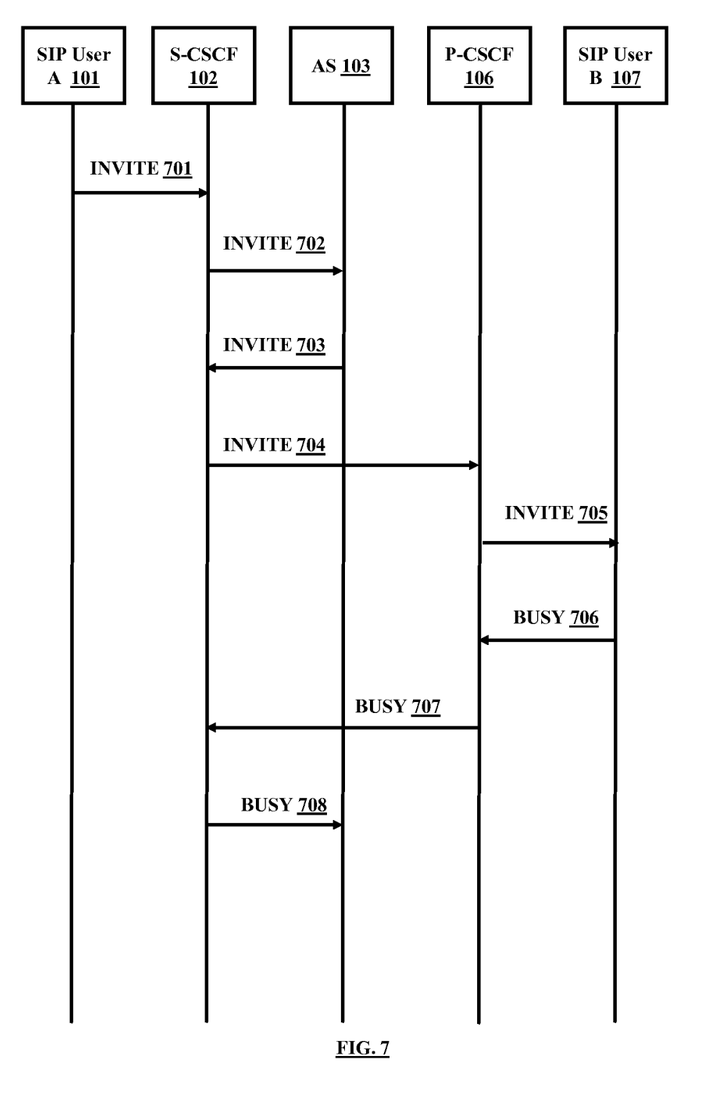
FIG. 7 illustrates a flow diagram for an example illustrating suppression of announcement when calling user is a SIP user and the called user is a SIP user, according to an embodiment herein.

FIG. 7 illustrates a flow diagram for an example illustrating suppression of announcement when calling user is a SIP user and the called user is a PSTN user. When a user in a communication network wishes to communicate with a second user, then the user sends a request to the second user through the network. If the communication session is to be established between a SIP user as the calling user and a PSTN user as the called user, then SIP user A 101 sends a request to SIP user B 107 through the network. The request message may be sent as an INVITE 701 message. The request would be received by the S-CSCF 102. The S-CSCF 102 receives requests for services from SIP user A 101, processes the requests and relays the request to the AS 103. The message sent by the S-CSCF 102 to the AS 103 may be an INVITE 702 message. When the AS 103 receives the request and on determining that SIP user A 101 wishes to start a communication session with SIP user B 107, the AS 103 tries to establish a communication link with SIP user B 107. If due to any reason, SIP user B 107 is not able to reply to the request, then a communication session would not be established between the users. An announcement would then be played to SIP user A 101 conveying the reason for the failure in establishment of communication session with SIP user B 107. The AS 103 adds an indicator in the request message and sends the subsequent message towards SIP user B 107 through the S-CSCF 102 and the P-CSCF 106. The indicator is added to suppress the announcement played to SIP user A 101. The message sent by the AS 103 to the S-CSCF 102 may be an INVITE 703 message and the message sent by the S-CSCF 102 to the P-CSCF 106 may be an INVITE 704 message. The P-CSCF 106 relays the message to SIP user B 107. The message sent by the P-CSCF 106 to SIP user B 107 may be an INVITE 705 message. If SIP user B 107 is busy and does not reply to the request then an indication would be sent to the P-CSCF 106. The indication may be sent as a BUSY 706 message and the message would indicate the reason for the SIP user B 107 not replying to the request. The P-CSCF 106 sends the indication to the S-CSCF 102. The indication sent by the P-CSCF 106 to the S-CSCF 102 may be a BUSY 707 message. On receiving the indication and determining that SIP user B 107 is busy, the S-CSCF 102 suppresses the failure announcement from being made to SIP user A 101. The S-CSCF 102 then sends the indication to the AS 103. The indication sent by the S-CSCF 102 to the AS 103 may be a BUSY 708 message. On receiving the indication and determining that the communication session was not established between SIP user A 101 and SIP user B 107, the AS 103 may allow SIP user A 101 to try to establish the communication session with a different destination number.

Figure 8:
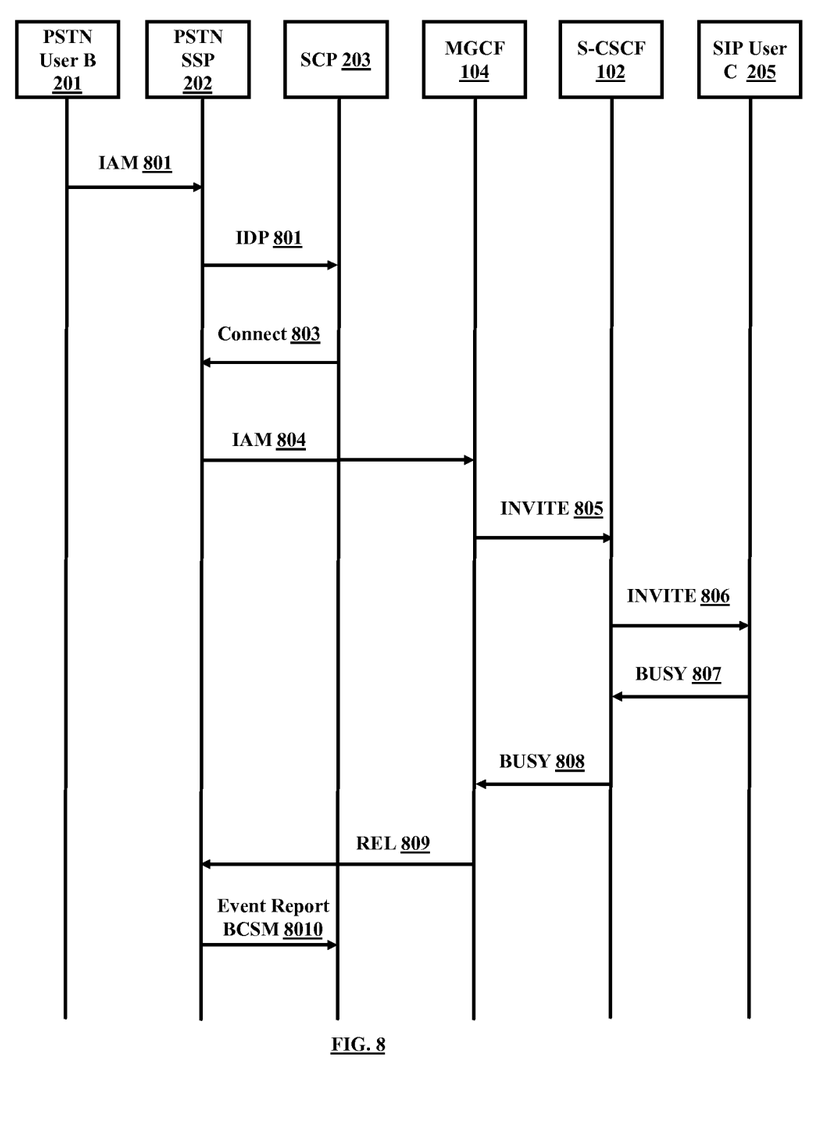
FIG. 8 illustrates a flow diagram for an example illustrating suppression of announcement when calling user is a PSTN user and the called user is a SIP user, according to an embodiment herein.

FIG. 8 illustrates a flow diagram for an example illustrating suppression of announcement when calling user is a PSTN user and the called user is a SIP user. When a user in a communication network wishes to communicate with a second user, then the user sends a request to the second user through the network. If the communication session is to be established between a PSTN user as the calling user and a SIP user as the called user, then PSTN user B 201 sends a request to SIP user C 205 through the network. The request message may be sent as an IAM 801. The request would be received by PSTN SSP 202. On receiving the request from the PSTN user B 201 and on determining that a communication session would have to be established between the users, the PSTN SSP 202 triggers the SCP 203. The PSTN SSP 202 sends the request to the SCP 203 and the message sent by PSTN SSP 202 to the SCP 203 may be an Initial Detection Point (IDP) 802. When the SCP 203 receives the request and on determining that PSTN user B 201 wishes to start a communication session with SIP user C 205, the SCP 203 tries to establish a communication link with SIP user C 205. If due to any reason, SIP user C 205 is not able to reply to the request, then a communication session would not be established between the users. An announcement would then be played to PSTN user B 201 conveying the reason for the failure in establishment of communication session with SIP user C 205. The SCP 203 adds an indicator in the request message and sends the subsequent message towards SIP user C 205. The indicator is added to suppress the announcement played to PSTN user B 201. The SCP 203 sends the message to the PSTN SSP 202 as a Connect 803 message. The message sent by the SCP 203 may also include an event indication to indicate the reason for failure in establishment of communication session. The event indications may be included as Event Report Basic Call State Model (BCSM). On receiving the message the PSTN SSP 202 maps the indication to an IAM 804. The indication may be mapped to the IAM 804 as "SOA: TRUE" in the National Parameter. The PSTN SSP 202 sends the IAM 804 to the MGCF 104. The MGCF 104 maps the indication to an INVITE 805 message. The indication may be mapped to the INVITE 805 message as "Allow: SOA" in the P-Interaction-Indicator. The MGCF 104 sends the invitation message to SIP user C 205. If SIP user C 205 is busy and does not reply to the request then an indication would be sent to the S-CSCF 102. The indication may be sent as a BUSY 807 message and the message would indicate the reason for the SIP user C 205 not replying to the request. On receiving the indication and determining that SIP user B 107 is busy, the S-CSCF 102 suppresses the failure announcement from being made to PSTN user B 201. The S-CSCF 102 then sends the indication to the MGCF 104. The message sent by the S-CSCF 102 to the MGCF 104 may be a BUSY 808 message. The MGCF 104 then sends a message to the PSTN SSP 202 to release the session as SIP user C 205 is busy. The message sent by the MGCF 104 to the PSTN SSP 202 may be a REL 809 message. The PSTN SSP 202 then sends an indication to the SCP 203 indicating the reason for failure in establishment of communication session. The indication may be sent as an Event Report BCSM 8010 message by the PSTN SSP 202 to the SCP 203.

The embodiments disclosed herein can be implemented through at least one software program running on at least one hardware device and performing network management functions to control the network elements. The network elements shown in FIG. 1, FIG. 2, FIG. 3 and FIG. 4 include blocks which can be at least one of a hardware device, or a combination of hardware device and software module.

The embodiment disclosed herein specifies a system and method for suppressing announcements from being announced to an IMS user. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another coding language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method for suppression of an announcement made to a user on said user requesting to start a communication session with a second user, the method comprising steps of:
   adding a suppression of announcement indicator in Connect operation while said communication session is being established with said second user; and
   suppressing said announcement from being played to said user if said second user is unable to answer said request and sending a busy message toward the second user.

2. The method, as claimed in claim 1, wherein said first user is a Session Initiation Protocol (SIP) user.

3. The method, as claimed in claim 1, wherein said first user is a Public Switched Telephone Network (PSTN) user.

4. The method, as claimed in claim 1, wherein said suppression of announcement indicator is added as a Suppression of Announcement (SOA) bit in said Connect operation.

5. The method, as claimed in claim 4, wherein said Suppression of Announcement (SOA) bit is added in P-ln-teraction-lndicator when said first user is a Session Initiation Protocol (SIP) user.

6. The method, as claimed in claim 4, wherein said Suppression of Announcement (SOA) bit is added in National-Parameter when said user is a Public Switched Telephone Network (PSTN) user.

7. The method, as claimed in claim 1, wherein said announcement indicates a reason for said second user being unable to answer said request.

8. The method, as claimed in claim 1, wherein Session Initiation Protocol (SIP) is an interface between said first user and said second user.

9. The method, as claimed in claim 1, wherein Integrated Services Digital Network (ISDN) User Part (ISUP) is an interface between said first user and said second user.

10. The method as claimed in claim 1, further comprising:
suppressing any announcement from being played to said first user if said second user is unable to answer said request.

\* \* \* \* \*